United States Patent
Han et al.

(10) Patent No.: US 10,051,257 B2
(45) Date of Patent: Aug. 14, 2018

(54) 3D IMAGE REPRODUCTION DEVICE AND METHOD CAPABLE OF SELECTING 3D MODE FOR 3D IMAGE

(71) Applicant: LG Electronics Inc., Seoul (KR)

(72) Inventors: Sang-Choul Han, Gyeongsangbuk-Do (KR); Hak-Tae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 160 days.

(21) Appl. No.: 14/727,377

(22) Filed: Jun. 1, 2015

(65) Prior Publication Data

US 2015/0381960 A1 Dec. 31, 2015

Related U.S. Application Data

(63) Continuation of application No. 13/320,880, filed as application No. PCT/KR2009/004075 on Jul. 22, 2009, now Pat. No. 9,066,077.

(Continued)

(51) Int. Cl.
*G06T 15/00* (2011.01)
*H04N 13/00* (2018.01)
(Continued)

(52) U.S. Cl.
CPC ......... *H04N 13/0029* (2013.01); *G09G 3/003* (2013.01); *H04N 13/0048* (2013.01);
(Continued)

(58) Field of Classification Search
None
See application file for complete search history.

(56) References Cited

U.S. PATENT DOCUMENTS

| 5,717,415 A | 2/1998 | Iue et al. |
| 2003/0117441 A1* | 6/2003 | Walls ............... G06T 15/005 715/771 |

(Continued)

FOREIGN PATENT DOCUMENTS

| CN | 1739304 A | 2/2006 |
| CN | 1882106 A | 12/2006 |

(Continued)

OTHER PUBLICATIONS

Wimmer, "Stereoscopic Player and Stereoscopic Multiplexer", Nov. 27-28, 2006, Munich, Germany, URL:http://3dtv.at, XP-002641946, pp. 1-21.

(Continued)

*Primary Examiner* — Andrew G Yang
(74) *Attorney, Agent, or Firm* — Birch, Stewart, Kolasch & Birch, LLP

(57) ABSTRACT

The present invention relates to a device for reproducing a 3D image, and provides a 3D image reproduction device capable of selecting a 3D mode for a 3D image, comprising: a formatting unit which generates and transmits 3D image data for an inputted image signal; a mode input unit which receives the selection from a user for a 3D mode that the user wants to reproduce; and a user input processor which enables the formatting unit to generate the 3D image data in the 3D mode that is inputted from the user.

11 Claims, 4 Drawing Sheets

Related U.S. Application Data

(60) Provisional application No. 61/179,018, filed on May 18, 2009.

(51) Int. Cl.
*H04N 13/04* (2006.01)
*G09G 3/00* (2006.01)

(52) U.S. Cl.
CPC ..... *H04N 13/0452* (2013.01); *H04N 13/0497* (2013.01); *G09G 2354/00* (2013.01)

(56) References Cited

U.S. PATENT DOCUMENTS

| | | |
|---|---|---|
| 2004/0057612 A1 | 3/2004 | Tabata |
| 2005/0259147 A1* | 11/2005 | Nam ................ H04N 13/0029 348/43 |
| 2006/0139448 A1* | 6/2006 | Ha ..................... H04N 13/0404 348/51 |
| 2006/0257016 A1 | 11/2006 | Shioi et al. |
| 2006/0279750 A1 | 12/2006 | Ha |
| 2007/0097024 A1 | 5/2007 | Jung et al. |
| 2007/0241936 A1 | 10/2007 | Arthur et al. |
| 2008/0303893 A1 | 12/2008 | Kim et al. |
| 2008/0309672 A1 | 12/2008 | Drive et al. |
| 2009/0040295 A1* | 2/2009 | Koo ................... G02B 27/2228 348/42 |
| 2010/0039428 A1 | 2/2010 | Kim et al. |
| 2012/0162367 A1 | 6/2012 | Ha |

FOREIGN PATENT DOCUMENTS

| | | |
|---|---|---|
| CN | 101982979 A | 3/2011 |
| CN | 102187680 A | 9/2011 |
| EP | 1 501 318 A1 | 1/2005 |
| JP | 2005-229280 A | 8/2005 |
| KR | 10-2006-0072676 A | 6/2006 |
| KR | 10-2007-0028087 A | 3/2007 |

OTHER PUBLICATIONS

Wimmer, "Stereoscopic Player and Stereoscopic Multiplexer: a computer-based system for stereoscopic video playback and recording", Proceedings of SPIE, vol. 5664, Mar. 22, 2005, XP-055092976, pp. 400-411.

* cited by examiner

[Fig. 1]
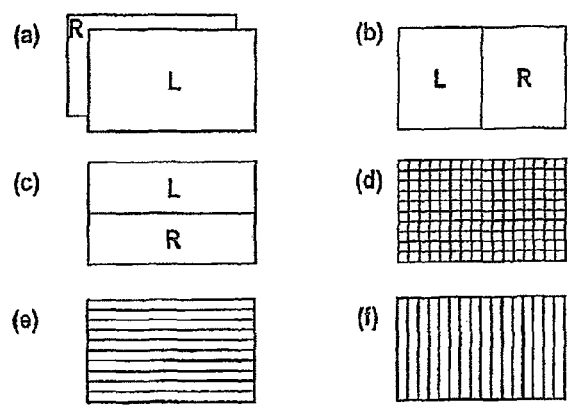
[Fig. 2]
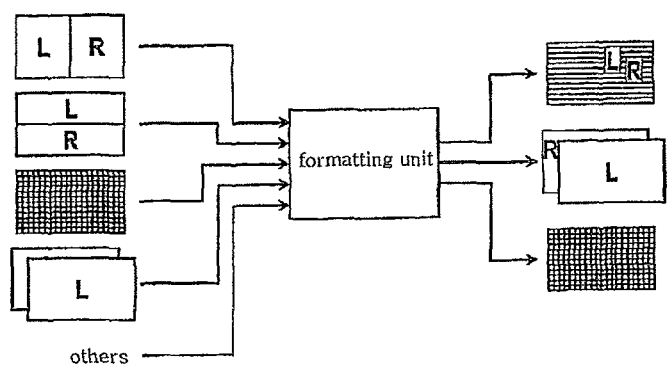

[Fig. 3]
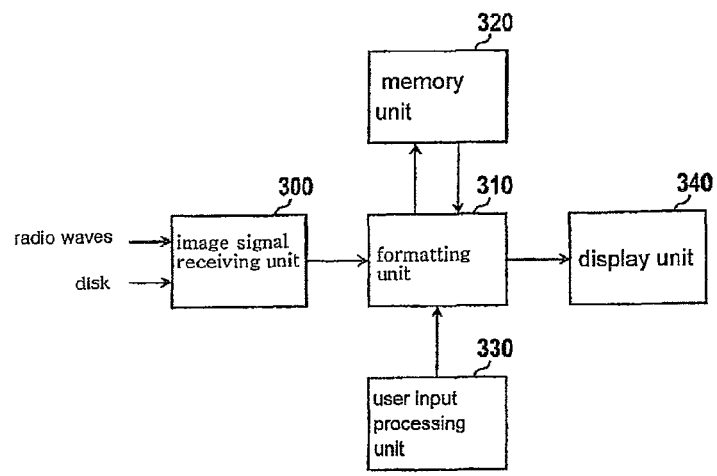
[Fig. 4]
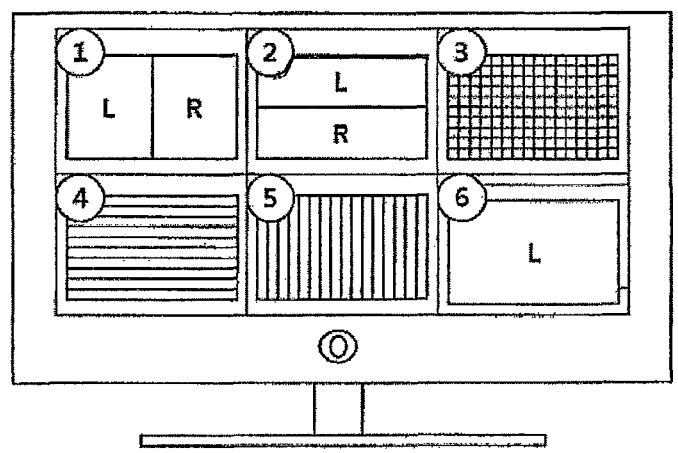

[Fig. 5]
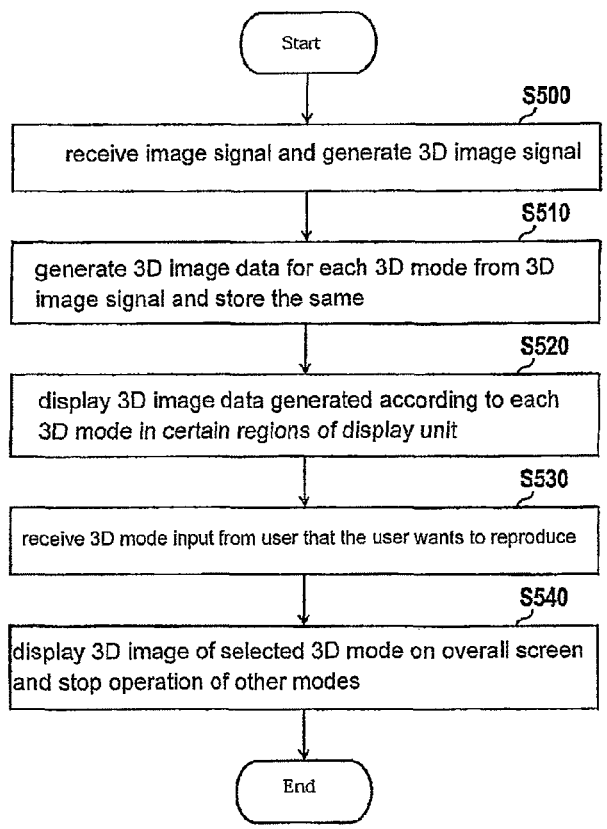
[Fig. 6]
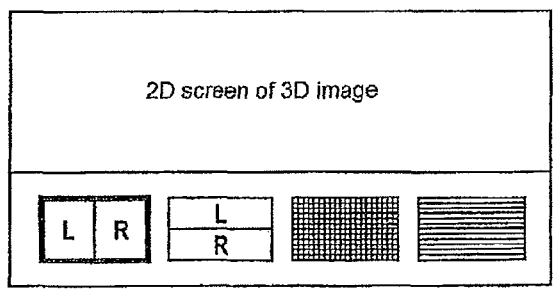

[Fig. 7]
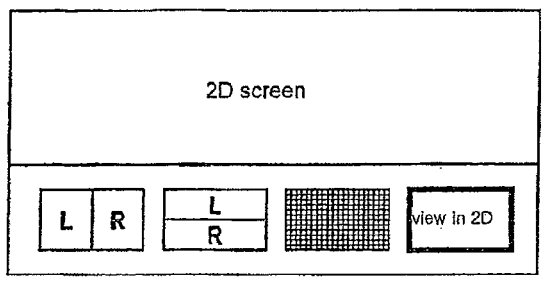
[Fig. 8]
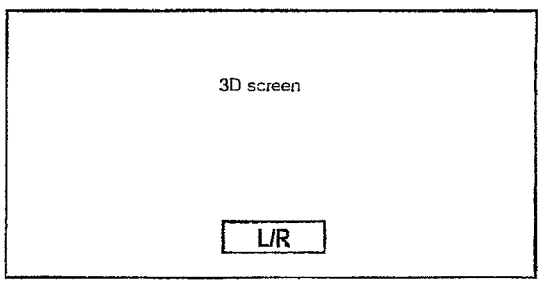

3D IMAGE REPRODUCTION DEVICE AND METHOD CAPABLE OF SELECTING 3D MODE FOR 3D IMAGE

CROSS-REFERENCE TO RELATED APPLICATIONS

This application is a Continuation of co-pending application Ser. No. 13/320,880 filed on Nov. 16, 2011, which is a National Stage of PCT/KR2009/004075 filed on Jul. 22, 2009, which claims the benefit of Provisional Application No. 61/179,018 filed on May 18, 2009. The contents of each of these applications are hereby incorporated by reference in their entirety.

BACKGROUND OF THE INVENTION

Field of the Disclosure

The present invention relates to a device and method for reproducing 3D images and, more particularly, to a device and method for reproducing 3D images of various 3D modes.

Description of the Related Art

Recently, as the interest in stereoscopic image services is growing, devices for providing stereoscopic images continue to be developed. Among the schemes for implementing such stereoscopic images is a stereoscopic scheme.

A basic principle of the stereoscopic image is that arranged images are separately input such that they are perpendicular to the left and right eyes of a person (or a user) and the images separately input to the left and right eyes are combined in the user's brain to generate a stereoscopic image. In this case, the arrangement of the images such that they are perpendicular means that the respective images do not interfere with each other.

Methods for preventing interference include a polarization scheme, a time-sequential scheme, and a spectral scheme.

First, the polarization scheme refers to separating respective images by using a polarization filter. Namely, the polarization filter perpendicular to an image for the left eye and an image for the right eye is employed to make different images filtered by the polarization filter input to the left and right visual fields. The time-division scheme refers to alternately displaying left and right images and active glasses worn by the user is synchronized with the alternately displayed images to thus separate the respective images. Namely, when the images are alternately displayed, the shutter of the synchronized active glasses opens only the visual field to which a corresponding image is to be input and blocks the other visual field to separately input the left and right images.

Meanwhile, the spectral scheme refers to projecting left and right images through a spectral filter having a spectrum band in which RGB spectrums do not overlap with each other. With respect to the thusly projected left and right images, the user wears passive glasses including a spectral filter passing through only a spectral area set for the left and right images, thus separately receiving the left and right images.

However, there are various 3D modes for the 3D image signals input to perform the foregoing related art 3D image implementing method, and failure of identifying 3D modes would lead to failure of implementation of 3D images.

In particular, in case of a 3D TV (three-dimensional television) displaying 3D images, unless the 3D modes are properly identified and formatted for a display output appropriately, 3D images cannot be properly displayed. Thus, in the case of the 3D TV, a 3D mode of an input 3D image signal is required to be confirmed and 3D image data is required to be formatted accordingly. However, a method enabling a 3D TV to confirm a 3D mode of an input 3D image signal and form a 3D image according to the corresponding mode has not been implemented yet.

Thus, without knowledge of such a situation, the user may fail to properly enjoy viewing of 3D images due to improper 3D image formatting. Also, in order to recognize and set a mode that is appropriate for the 3D mode applied to the 3D image signal, users are faced with inconveniences.

Therefore, an object of the present invention is to provide a 3D image reproduction device and method capable of allowing for easily confirming the 3D mode that is appropriate for the input 3D image signals.

Another object of the present invention is to provide a 3D image reproduction device and method capable of confirming a 3D mode appropriate for an input 3D image signal and quickly changing a setting into a corresponding mode.

Another object of the present invention is to provide a 3D image reproduction device and method capable of allowing for quickly confirming and setting a 3D mode appropriate for an input 3D image signal, thereby improving the convenience for the user.

SUMMARY OF THE INVENTION

According to an aspect of the present invention, there is provided a device for reproducing a 3D image capable of selecting a 3D mode for a 3D image, including: a formatting unit which generates and transmits 3D image data for an inputted image signal; a mode input unit which receives the selection from a user for a 3D mode that the user wants to reproduce; and a user input processor which enables the formatting unit to generate the 3D image data in the 3D mode that is inputted from the user.

The device may further include: a display unit that displays the received 3D image data, wherein the formatting unit may generate the 3D image data according to each 3D mode with respect to the input image signal, and transmit the 3D image data to the display unit such that the 3D image data is displayed predetermined regions set for each 3D mode.

The device may further include: a memory unit that stores the 3D image data for each of the 3D modes generated by the formatting unit. The memory unit may be integrally configured with the formatting unit.

The formatting unit may display the 3D image data generated in the 3D mode input by the user, on the overall screen of the display unit.

According to another aspect of the present invention, there is provided a method for reproducing a 3D image capable of selecting a 3D mode for a 3D image, including: a first step of generating and transmitting 3D image data for each 3D mode with respect to an input 3D image signal; a second step of displaying the received 3D image data on predetermined regions set for each 3D mode; and a third step of receiving the selection from the user for a 3D mode that the user wants to reproduce and generating the 3D image data in a 3D mode input by the user based on the selected 3D mode.

According to another aspect of the present invention, there is provided a method for reproducing a 3D image capable of selecting a 3D mode for a 3D image, including: a first step of processing an input 3D image signal in the same manner as that of a general 2D image signal and displaying the same along with a screen allowing for selecting a 3D mode with respect to the 3D image signal; a second step of receiving the selection from the user for a 3D mode that the user wants to reproduce; and a third step of generating 3D image data in the 3D mode received from the user and displaying the generated 3D image data.

In the device and method for reproducing a 3D image according to embodiments of the present invention, a 3D mode appropriate for an input 3D image signal can be easily confirmed.

Also, a 3D mode appropriate for an input 3D image signal can be easily confirmed, and a setting can be quickly changed into a corresponding mode.

In addition, since a 3D mode appropriate for an input 3D image signal can be quickly confirmed and set, the convenience of use for the user can be enhanced.

BRIEF DESCRIPTION OF THE DRAWINGS

FIG. 1 illustrates six views including: (a) a view showing a frame sequential mode among 3D modes of an input 3D image signal, (b) a view showing a side-by-side mode among 3D modes of an input 3D image signal, (c) a view showing a top-down mode among 3D modes of an input 3D image signal, (d) a view showing a checker board mode among 3D modes of an input 3D image signal, (e) a view showing a horizontal interlaced mode among 3D modes of an input 3D image signal, and (f) a view showing a vertical interlaced mode among 3D modes of an input 3D image signal.

FIG. 2 is a view explaining an operation of formatting a 3D image signal, by an existing formatting unit, to output 3D image display.

FIG. 3 is a schematic block diagram of a device for reproducing a 3D image according to an embodiment of the present invention.

FIG. 4 is a view showing an example of a method for displaying 3D image data generated for each mode on predetermined regions of a display unit by the 3D image reproduction device according to an embodiment of the present invention.

FIG. 5 is a flow chart illustrating an operation of the 3D image reproduction device according to an embodiment of the present invention.

FIG. 6 is a view showing an example of a method for confirming and setting a 3D mode of a 3D image signal by using a 2D image screen by the 3D image reproduction device according to an embodiment of the present invention.

FIG. 7 is a view showing an example of displaying a 2D image change area allowing for selecting of changing into a 2D image by the 3D image reproduction device according to an embodiment of the present invention.

FIG. 8 is a view showing an example of displaying a left/right image change selection area for changing positions of left and right images by the 3D image reproduction device according to an embodiment of the present invention.

DETAILED DESCRIPTION OF THE EMBODIMENTS

The term 3-D or 3D is used to describe a visual expression or display technique for reproducing 3D images/video having the illusion effect of depth. As for a left eye image and a right eye image, the visual cortex of an observer (or a user) interprets the two images as a single 3D image.

A 3D display technique employs a 3D image processing and expressing technique with respect to a device available for displaying a 3D image. Optionally, the device available for displaying a 3D image may use a special observation or viewing device in order to effectively provide a 3D image to the observer.

Display devices for displaying a 3D image may include, for example, an LED (Liquid Crystal Display), a digital TV screen, a computer monitor, or the like, including appropriate hardware and/or software supporting a 3D display technique. Special observation devices may include, for example, specialized glasses, goggles, head gear, eyewear, and the like.

In detail, the 3D image display technique may include an anaglyph stereoscopic image (which is generally used together with passive anaglyph glasses), a polarized stereoscopic image (which is generally used together with passive polarized glasses), alternate-frames sequencing (which is generally used together with active shutter glasses/head gear), an autostereoscopic display using a lenticular or barrier screen, and the like. Various concepts and features described hereinafter can be applicable to such stereoscopic image display techniques.

A 3D image display technique may use an optical device which rotates or alternately operates, e.g., a segmented polarizer attached to a color filter wheel, and in this case, synchronization therebetween is required. Another 3D image display technique may use a digital light processor (DLP) based on a digital micromirror device (DMD) using a rotatable microscopic mirror disposed in a quadrangular arrangement corresponding to pixels of an image to be displayed.

Meanwhile, new standards related to a stereoscopic image rendering and display technique (in particular, 3D TV) is currently being developed by various enterprises, consortiums, and organizations. For example, the new standards may include SMPTE (the Society of Motion Picture and Television Engineers), CEA (Consumer Electronics Association), 3d@Home consortium, ITU (International Telecommunication Union), and the like. Besides, other standardization groups such as DVB, BDA, ARIB, ATSC, DVD forum, IEC, etc. are participating. MPEG (Moving Picture Experts Group) is participating 3D image coding of a multiview image, a stereoscopic image, and a 2D image having depth information, and currently, a multiview video codec extension with respect to MPEG-4 AVC (advanced video coding) is under standardization. Stereoscopic image coding and stereoscopic distribution formatting are related with color shifting (anaglyph), pixel sub-sampling (side-by-side, checkerboard, quincunx, etc.), and enhanced video coding (2D+Delta, 2D+Metadata, 2D having depth information). Concepts and features described herein can be applicable to such standards.

In addition, at least a portion of the concepts and features of the invention described herein are related with a 3D image display technique explained in the aspect of image reproducing and display environment with respect to a digital image or a 3D TV. However, details thereof do not limit various features described herein and can be applicable to various other types of display techniques and devices. For example, the 3D TV technique can be applicable to Blu-Ray™, console games, cable, IPTV transmissions, mobile phone contents delivery, and the like, as well as to TV broadcasts, and in this case, the 3D TV technique is required to be compatible with a different type TV, a set-top box (STB), a Blu-ray device (e.g., a Blu-Ray™ disk (BD) player), a DVD player, and a TV contents distributor.

Exemplary embodiments of the present invention will now be described in detail with reference to the accompanying drawings. The same reference numerals denote the same elements throughout the drawings.

When left and right images are transmitted to form a stereoscopic image, frames of 60 times or more per second are transmitted for the respective images. Namely, when the images are displayed on a screen at a rate of a total 120 Hz or higher, a stereoscopic image without flickering can be implemented.

In this case, 3D modes applicable to an input 3D image signal may include a frame sequential scheme, a side-by-side scheme, a top-down scheme, a checker board scheme, an interlaced scheme, and the like.

Hereinafter, various 3D modes applicable to a 3D image signal will be described with reference to FIGS. 1(a) to 1(f). FIGS. 1(a) to 1(f) are views showing various 3D modes applied to a 3D image signal.

First, FIG. 1(a) is a view showing a frame sequential mode among 3D modes of a 3D image signal.

As shown in FIG. 1(a), in the frame sequential mode, left and right images are sequentially alternately positioned as one frame each.

FIG. 1(b) is a view showing a side-by-side mode among 3D modes of a 3D image signal.

As shown in FIG. 1(b), the side-by-side mode is half sub-sampling the left and right images, respectively, in a horizontal direction and positioning the sampled left and right images at left and right portions, respectively.

FIG. 1(c) is a view showing a top-down mode among 3D modes of an input 3D image signal.

As shown in FIG. 1(c), the top-down mode is half sub-sampling the left and right images in a vertical direction and positioning the left and right images at upper and lower portions.

FIG. 1(d) is a view showing a checker board mode among 3D modes of an input 3D image signal.

As shown in FIG. 1(d), the checker board mode is half sub-sampling the left and right images in vertical and horizontal directions, respectively, and alternately positioning the pixels of the sampled left image and those of the sampled right image by one pixel each time.

FIG. 1(e) is a view showing a horizontal interlaced mode among 3D modes of an input 3D image signal.

As shown in FIG. 1(e), the horizontal interlaced mode is half sub-sampling the left and right images in a vertical direction and positioning the pixels of the sampled left image and those of the sampled right image alternately by line.

FIG. 1(f) is a view showing a vertical interlaced mode among 3D modes of an input 3D image signal.

As shown in FIG. 1(f), the vertical interlaced mode is half sub-sampling the left and right images in a horizontal direction and positioning the pixels of the sampled left image and those of the sampled right image alternately by line.

In general, the formatting unit of the 3D image reproduction device receives 3D image signals having various modes as mentioned above, formats the same for a 3D image display output, and transmits the formatted signals to a display device such as an LCD panel.

In this case, if a 3D mode of the 3D image signal does not fit the form of the formatting performed by the formatting unit, a 3D image cannot be properly displayed on the display device. FIG. 2 is a view explaining the operation of the formatting unit.

FIG. 2 is a view explaining an operation of formatting a 3D image signal, by an existing formatting unit, to output 3D image display.

The present invention proposes a method for allowing a user to easily confirm various 3D modes of a 3D image signal and quickly setting an appropriate mode.

A 3D image reproduction device according to an embodiment of the present invention will be described in detail with reference to FIG. 3. FIG. 3 is a schematic block diagram of a 3D image reproduction device according to an embodiment of the present invention.

The 3D image reproduction device according to an embodiment of the present invention includes an image receiving unit 300 receiving an image signal and generating a 3D image signal, a formatting unit 310 receiving the 3D image signal and formatting the same according to each mode to generate 3D image data, a memory unit 320 storing the 3D image data generated for each mode by the formatting unit 310, a user input processing unit 330 receiving a selection with respect to a 3D mode from the user and controlling the formatting unit 310 based on the received selection, and a display unit 340 displaying a 3D image.

The operation of the 3D image reproduction device configured as described above will be described in detail.

First, the image signal receiving unit 300 receives radio waves such as a broadcast signal or an image signal from a storage medium such as a disk, or the like, and generates a 3D image signal therefrom. In general, image data transmitted by radio waves or a disk is formatted in the form of transport stream of a moving picture experts group (MPEG) system.

In particular, MPEG-2, a processing method for compressing high quality video, is widely used in various fields such as a storage medium such as a digital versatile disk (DVD), a satellite cable, a digital TV broadcast such as terrestrial waves, or the like, a personal video recorder (PVR), a video transmission in a network, and the like.

The formatting unit 310 formats the received 3D image signal according to each mode to generate 3D image data and stores the generated data in the memory unit 320. Namely, the formatting unit 310 formats the received 3D image signal according to the frame sequential mode, the side-by-side mode, the top-down mode, the checker board mode, a horizontal interlaced mode, a vertical interlaced mode, and the like, and stores the generated 3D image data in the memory unit 320.

In this case, it may be configured such that the types of the 3D modes are stored as default values in the formatting unit 310. In a different embodiment of the present invention, it may be configured such that the types of 3D modes are received from a user.

Also, the formatting unit 310 transmits the 3D image data of each mode to the display unit 340 to display the 3D image data in predetermined regions set for each 3D mode, respectively. A method for displaying the 3D image data generated for each mode in predetermined regions of the display unit 340 is illustrated in FIG. 4.

FIG. 4 is a view showing an example of a method for displaying 3D image data generated for each mode on predetermined regions of a display unit by the 3D image reproduction device according to an embodiment of the present invention.

Here, the predetermined regions of the display unit 340 on which the 3D image data of each mode are displayed may be configured to be stored as a default value. In a different embodiment of the present invention, the configuration of the predetermined regions for each mode may be changed by the user.

Meanwhile, the memory unit 320 stores 3D image data generated according to each 3D mode by the formatting unit 310. In a different embodiment of the present invention, the memory unit 320 may not be separately provided but may be integrally configured with the formatting unit 310. Also, in a different embodiment of the present invention, the formatting unit 310 may transmit 3D image data for each 3D mode upon generating the same to the display unit 340 to allow the display unit 340 to display the same, without the memory unit 320.

When a 3D mode selection is input from the user the user input processing unit 330 controls the formatting unit 310 accordingly to display 3D image data of a 3D mode selected by the user on the overall screen of the display unit 340 and stop generation of 3D image data in a different 3D mode.

Here, as a device for inputting the selection of the 3D mode to the user input processing unit 330 by the user, an input button, a remote controller, or the like, may be used.

The display unit 340 displays the 3D image data transferred from the formatting unit 310. As the display unit 340, an LCD panel may be, for example, used.

An operation of the 3D image reproduction device according to an embodiment of the present invention will be described with reference to FIG. 5. FIG. 5 is a flow chart illustrating an operation of the 3D image reproduction device according to an embodiment of the present invention.

First, the image signal receiving unit 300 receives radio waves such as a broadcast signal or an image signal from a storage medium such as a disk, or the like, and generates a 3D image signal therefrom (S500).

The formatting unit 310 formats the 3D image signal input from the image signal receiving unit 300 according to each 3D mode to generate 3D image data, and stores the generated 3D image data in the memory unit 320 (S510).

Thereafter, the formatting unit 310 transmits the 3D image data generated for each 3D mode to the display unit 340 to display the 3D image data in predetermined regions set for each 3D mode, respectively (S520).

The user input processing unit 330 receives a 3D mode that the user wants to reproduce among the displayed 3D modes through an input button, or the like, from the user (S530).

The user input processing unit 330 controls the formatting unit 310 based on the mode selection input from the user to display the 3D image data generated in the 3D mode selected by the user on the overall screen of the display unit 340 and stop generation of 3D image data in other modes (S540).

Through such an operation, the 3D image reproduction device according to an embodiment of the present invention can quickly confirm and set the 3D mode appropriate for the input 3D image signal, thereby improving the convenience of usage for the user.

Meanwhile, in a different embodiment of the present invention, rather than formatting a 3D image signal according to each 3D mode and displaying the same, an input 3D image signal may be first displayed in the form of a 2D image, and the user may visually confirm and set a corresponding 3D mode through the screen of the displayed 2D image.

The different embodiment of the present invention using a 2D image screen is illustrated in FIG. 6. FIG. 6 is a view showing an example of a method for confirming and setting a 3D mode of a 3D image signal by using a 2D image screen by the 3D image reproduction device according to an embodiment of the present invention.

As shown in FIG. 6, a 3D image signal may be processed in the same manner as that of a general 2D image signal and displayed at an upper portion of the screen, and the 2D image at the upper portion of the screen has a screen configuration according to a 3D mode of a 3D image signal.

For example, when the 3D image signal has a side-by-side mode, a 2D image generated from the 3D image signal is displayed in a state in which a left image is positioned at a left portion of the screen and a right image is positioned at a right portion of the screen. Also, when the 3D image signal has a top-down mode, a 2D image generated from the 3D image signal may be displayed such that a left image is positioned at an upper portion of the screen and a right image may be positioned at a lower portion of the screen.

Thus, the user can visually confirm the 3D image of the input 3D image signal, and thereafter, the user may select a 3D mode consistent with a 2D image from among the 3D modes displayed at the lower portion of the screen, thereby easily setting the 3D mode appropriate for the 3D image signal.

Also, in a different embodiment of the present invention, a 3D image may be changed into a 2D image according to a user selection. Namely, a 2D image selection area may be displayed on the screen displayed to allow selection of a 3D mode, and when a change into a 2D image is selected through a 2D image selection area, displaying of the 3D image may be stopped and a general 2D image may be displayed.

An example of displaying a 2D image selection area on the screen according to a different embodiment of the present invention is illustrated in FIG. 7. FIG. 7 is a view showing an example of displaying a 2D image change area allowing for selecting of changing into a 2D image by the 3D image reproduction device according to an embodiment of the present invention. Accordingly, the user may select a 3D image or a general 2D image.

Here, the 2S image may be displayed by selecting any one of a left image and a right image included in a 3D image signal, or the left and right images may be interpolated to generate a 2D image and the generated 2D image may be displayed.

Meanwhile, in a different embodiment of the present invention, the positions of left and right images may be interchanged according to a user selection while a 3D image is being reproduced, thus generating a 3D image.

Namely, it may happen that positions of left and right image frames constituting a 3D image are not properly set in the process of producing 3D image content.

In such a case, since the positions of the left and right image frames have been interchanged, a left image is input to a human's right eye and a right image is input to the human's left eye. As a result, the stereoscopic effect of the 3D image is implemented to be opposite to the original 3D image content, making the user feel mismatch of the 3D image screen.

Thus, in such a case, in an embodiment of the present invention, the left and right images for generating a 3D image are interchanged to generate a 3D image, to thus adjust mismatch of the screen resulting from the erroneous setting of the 3D image content.

An example of displaying a left/right image change selection area for changing left and right images is illustrated in FIG. 8. FIG. 8 is a view showing an example of displaying a left/right image change selection area for changing positions of left and right images by the 3D image reproduction device according to an embodiment of the present invention. Here, the changing of the left and right Images may be performed in a toggle manner.

As shown in FIG. 8, the user may select the left/right image change selection area to allow the 3D image reproduction device according to an embodiment of the present invention to generate a 3D image by changing the positions of the left and right images. Through this method, the 3D image reproduction device according to an embodiment of the present invention can adjust the mismatch of the screen resulting from the 3D image content.

Various embodiments have been described to explain original concepts related to various aspects of the present invention. However, one or more detailed features of a particular embodiment may be applicable to one or more other embodiments. Components or steps described in each embodiment and relevant drawings may be modified and supplementary components and/or steps may be deleted, moved, or included.

The various features and concepts described here can be implemented by software, hardware, firmware, middleware, or a combination thereof. For example, a computer program (which is executed by a computer, a processor, a controller, or the like) stored in a computer-executable medium to implement the method and device for receiving a stereoscopic image signal in a digital broadcast may include one or more program code sections performing various operations. Similarly, software tools (which are executed by a computer, a processor, a controller, or the like) stored in a computer-executable medium to implement the method and device for receiving a stereoscopic image signal in a digital broadcast may include part of program codes performing various operations.

The present invention can be applicable to various types of devices, namely, a digital TV, an LCD display device, a personal media player (PMP), a mobile phone, or the like, configured to receive and process a digital broadcast signal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A device for reproducing 3D (three-dimensional) images, the device comprising:
   a user input unit configured to receive a user input;
   a display unit; and
   a formatter configured to receive a 3D image signal and convert the received 3D image signal to 3D image data to be displayed on the display unit according to one of a plurality of 3D signal formats,
   wherein 3D mode information including a plurality of mode images representing the plurality of 3D signal formats, respectively, is displayed on the display unit for selection by a user,
   wherein each of the plurality of mode images is selectable by the user through the user input unit,
   wherein a left image and a right image are generated by formatting the 3D image signal in a 2D image formatting manner,
   wherein the 2D formatting manner represents that the left image and the right image are displayed separate from each other without overlapping and without providing a 3D effect,
   wherein the left image and the right image are displayed side by side on the display unit, if a 3D signal format of the 3D image signal corresponds to a side-by-side format,
   wherein the left image and the right image are displayed at an upper portion and a lower portion of the display unit, if the 3D signal format of the 3D image signal corresponds to a top-down format,
   wherein the left image, the right image and the 3D mode information are displayed on the display unit, simultaneously,
   wherein the user input unit is further configured to receive a user selection of a mode image among the displayed plurality of mode images, and
   wherein the formatter is further configured to format the 3D image signal according to a particular 3D signal format corresponding to the selected mode image, so as to generate the 3D image data corresponding to the 3D image signal.

2. The device of claim 1, wherein the user input unit is further configured to receive the user selection of the mode image among the displayed plurality of mode images in a state where the 3D image signal is displayed on the display unit in a 2D image format.

3. The device of claim 1, wherein the plurality of 3D signal formats include a side-by-side 3D format and a top-down 3D format.

4. The device of claim 1, wherein the plurality of mode images are displayed at a predetermined region of the display unit, and
   wherein the predetermined region of the display unit is a part of an entire screen of the display unit.

5. The device of claim 4, wherein the generated 3D image data corresponding to the 3D image signal formatted according to the particular 3D signal format is displayed on the entire screen of the display unit.

6. The device of claim 4, wherein a 2D image selection area is included in the predetermined region of the display unit.

7. The device of claim 1, wherein one of left and right images included in the 3D image signal is displayed on the display unit when the user input unit receives a user selection for displaying a 2D image.

8. The device of claim 1, wherein positions of left and right images of the 3D image data are changed according to a user's input, and thereby the display unit displays a new 3D image composed of the left and right images.

9. A device for reproducing 3D (three-dimensional) images, the device comprising:
   a user input unit which receives a selection from a user;
   a formatter which receives a 3D image signal, formats the 3D image signal to generate 3D image data; and
   a display unit,
   wherein 3D mode information including different types of 3D modes is displayed at a predetermined region of the display unit,
   wherein a left image and a right image are generated by formatting the 3D image signal in a 2D formatting manner,
   wherein the 2D formatting manner represents that the left image and the right image are displayed separate from each other without overlapping and without providing a 3D effect,
   wherein the left image and the right image are displayed side by side on the display unit, if a 3D signal format of the 3D image signal corresponds to a side-by-side format, wherein the left image and the right image are displayed at an upper portion and a lower portion of the display unit, if the 3D signal format of the 3D image signal corresponds to a top-down format, wherein the left image, the right image and the 3D mode information are displayed on the display unit, simultaneously, wherein the user input unit receives a user selection of a 3D mode among the different types of 3D modes included in the 3D mode information, and wherein the formatter formats the image signal into a particular 3D format represented by the user selected 3D mode, so as to generate 3D image data corresponding to the received 3D image signal.

10. The device of claim 9, wherein the user input unit is further configured to receive the user selection of the 3D mode among the different types of 3D modes in a state where wherein the 3D image signal is displayed on the display unit in a 2D image format.

11. The device of claim 10, wherein the different types of 3D modes include at least one of a side-by-side 3D mode and a top-down 3D mode.

\* \* \* \* \*